C. B. SCHOENMEHL.
BATTERY ELECTRODE.
APPLICATION FILED JUNE 10, 1908.

922,726.

Patented May 25, 1909.

WITNESSES
Elbert D. Hull
Ruth Raymond

INVENTOR
Charles B. Schoenmehl
BY
Chamberlain & Newman
ATTORNEYS

UNITED STATES PATENT OFFICE.

CHARLES B. SCHOENMEHL, OF WATERBURY, CONNECTICUT.

BATTERY-ELECTRODE.

No. 922,726.　　　Specification of Letters Patent.　　　Patented May 25, 1909.

Application filed June 10, 1908. Serial No. 437,613.

*To all whom it may concern:*

Be it known that I, CHARLES B. SCHOENMEHL, a citizen of the United States, and resident of Waterbury, in the county of New Haven and State of Connecticut, have invented certain new and useful Improvements in Battery-Electrodes, of which the following is a specification.

My invention relates to primary batteries, and particularly to a negative electrode therefor as for instance one formed of metallic oxid.

The invention more especially refers to that class of electrodes formed of oxid of copper, and in compressed cylindrical form, which in the art of manufacture are first shaped to desired form by means of a heavy press and then baked and hardened in a suitable furnace.

The objects of the invention are primarily to improve the efficiency of batteries of the above class by forming a negative electrode in several parts, or sections and in a way to increase the amount of exposed surface; to suitably space the said parts with relation to each other, and further to provide a simple and convenient means for assembling and supporting the said parts to form a commercial electrode, suitable for any size battery, and with attached means for suspending it from a battery cover.

Referring to the accompanying drawings forming a part of this specification and upon which similar characters of reference denote like or corresponding parts throughout the several figures.

Figure 1:
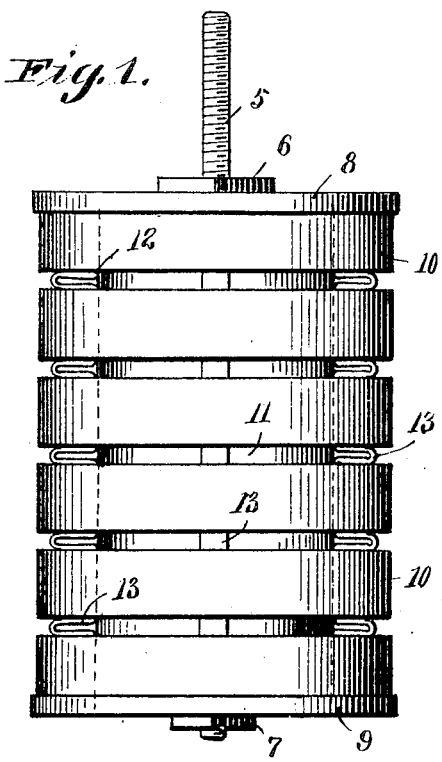
Figure 2:
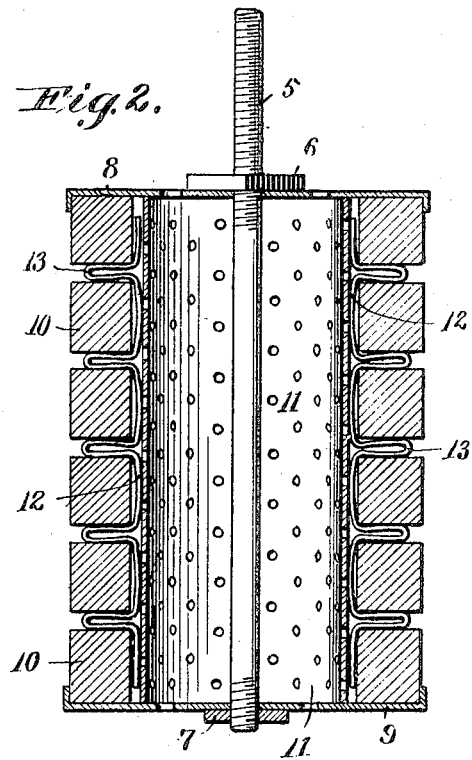
Figure 3:
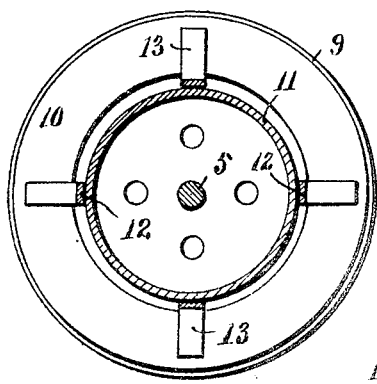
Figure 5:
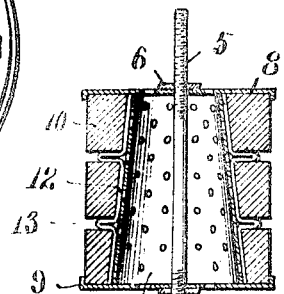
Figure 4:
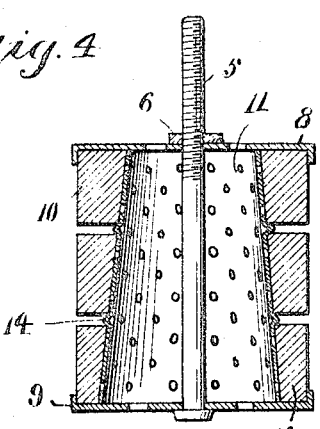

Figure 1, shows a side elevation of one of my sectional compressed cylindrical copper oxid electrodes ready for attachment to a cover of a battery. Fig. 2, is a central vertical cross section through the element shown in Fig. 1. Fig. 3, is a sectional plan view of my electrode, taken on line 3—3 of Fig. 1, and Fig. 4, is a further central sectional view on a reduced scale of a negative electrode comprising but three sections the top one of which is thicker than the lower ones. Fig. 5, shows a central vertical sectional view of modified form of element somewhat like Fig. 4, but also illustrating the use of the strips 12 for supporting the several sections comprising the element.

As will be seen the invention consists in forming and assembling a series of compressed annular metal oxid sections as for instance copper, of suitable size and shape, and removably supporting the same one above the other for use within a battery jar and in connection with a circular positive electrode. The size and number of the several annular sections employed to form my negative electrode, may be varied according to requirements, and likewise the relative proportionate size of the respective sections in an element may be varied to advantage as shown in Fig. 4, wherein a thick section is used at the top and thinner ones below. It will also be readily seen that by the addition or omission of one or more sections, an element of greater or less capacity can readily be produced as for use in large or small batteries.

In detail 5 represents a rod to which the several parts of my electrode are attached and by means of which my new electrode is supported from the cover of a battery jar (not shown).

6 and 7 indicate an upper and lower nut that are threaded to engage the rod and upper and lower end caps 8 and 9 respectively which abut against the outer compressed annular copper oxid sections 10, and likewise the internal cylindrical metal form 11, which serves to aline and retain the sections in place. This form may be constructed from wire, if desired, but preferably, perforated sheet metal that is adapted to readily permit the battery solution to circulate therethrough. In practice I prefer to form it of a length substantially equal to that of the distance between the end caps 8 and 9 though it can be cut shorter and still operate with the same results.

As shown in Figs. 1, 2 and 3, I have indicated six sections in the electrode all of which are the same size and horizontally arranged, but I do not wish to confine myself in either of these respects. I further provide means for spacing the sections one from the other to insure an exposure of all sides of each copper section and to allow of the circulation of a depolarizing fluid therethrough. This spacing means may be of any suitable device either in the form of sheet metal strips 12 arranged longitudinally and provided with laterally disposed portions 13 at suitable distance apart and intermediate of which the sections are supported as shown in Figs. 1, 2 and 3. This supporting means may also be produced by forming ribs 14 upon the outside of the perforated cylinder as seen in Fig. 4, and intermediate of which the said rings are arranged.

I further do not wish to limit myself to any particular means for supporting the electrode in a battery, though I find that the rod shown is perhaps the most desirable from a manufacturing and commercial standpoint.

Having thus described my invention what I claim and desire to secure by Letters Patent is:—

1. A negative electrode for batteries, comprising a series of annular compressed copper oxid sections arranged one above the other, the upper one being of greater mass than the lower ones, and means for clustering and supporting said sections.

2. A negative electrode for batteries comprising a series of annular compressed copper oxid sections arranged one above the other, strips arranged against the inside of said sections and provided with outwardly disposed loop portions intermediate of the sections to separate the same.

3. A negative electrode for batteries, comprising a series of compressed annular oxid of copper sections, a form upon which they are supported, strips interposed between the form and sections to separate the same, caps to engage the end section, and a rod to bind the parts together.

4. A negative electrode for batteries, comprising a series of compressed annular oxid of copper sections, a form upon which they are supported, independent strips interposed between the sections to separate and support the same.

5. A negative electrode for batteries, comprising a series of compressed copper oxid sections arranged adjacent to but spaced one from the other, a perforated cylinder around which they are supported, one above the other, and means for engaging and supporting the said cylinder.

Signed at Bridgeport, in the county of Fairfield and State of Connecticut, this 1st day of June, A. D., 1908.

CHARLES B. SCHOENMEHL.

Witnesses:
C. M. NEWMAN,
RUTH RAYMOND.